US008275993B2

(12) United States Patent      (10) Patent No.: US 8,275,993 B2
Pravetz et al.      (45) Date of Patent: *Sep. 25, 2012

(54) AUTHOR SIGNATURES FOR LEGAL PURPOSES

(75) Inventors: James D. Pravetz, Sunnyvale, CA (US); Krish Chaudhury, Milpitas, CA (US); Sunil C. Agrawal, Milpitas, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/848,845

(22) Filed: Aug. 2, 2010

(65) Prior Publication Data

US 2011/0083191 A1     Apr. 7, 2011

Related U.S. Application Data

(63) Continuation of application No. 11/966,866, filed on Dec. 28, 2007, now Pat. No. 7,774,608, which is a continuation of application No. 10/442,679, filed on May 20, 2003, now Pat. No. 7,315,947.

(51) Int. Cl.
*H04L 9/00* (2006.01)
(52) U.S. Cl. ....................................................... 713/176
(58) Field of Classification Search .................. 713/164, 713/165, 167, 176, 178, 179, 180, 181; 726/10, 726/21, 26
See application file for complete search history.

(56) References Cited

U.S. PATENT DOCUMENTS

| | | | |
|---|---|---|---|
| 5,465,299 A | 11/1995 | Matsumoto et al. | |
| 5,892,904 A | 4/1999 | Atkinson et al. | |
| 6,076,166 A | 6/2000 | Moshfeghi et al. | |
| 6,415,278 B1 | 7/2002 | Sweet et al. | |
| 6,418,457 B1 | 7/2002 | Schmidt et al. | |
| 6,532,541 B1 | 3/2003 | Chang et al. | |
| 6,848,048 B1 | 1/2005 | Holmes | |
| 7,213,269 B2 | 5/2007 | Orthlieb et al. | |
| 7,278,168 B1 | 10/2007 | Chaudhury et al. | |
| 7,315,947 B2 * | 1/2008 | Pravetz et al. | 713/176 |
| 7,698,559 B1 | 4/2010 | Chaudhury et al. | |
| 7,735,144 B2 | 6/2010 | Pravetz et al. | |
| 7,774,608 B2 * | 8/2010 | Pravetz et al. | 713/176 |
| 7,913,314 B2 | 3/2011 | Orthlieb et al. | |
| 2002/0019838 A1 | 2/2002 | Petrogiannis | |
| 2003/0028774 A1 * | 2/2003 | Meka | 713/176 |

(Continued)

FOREIGN PATENT DOCUMENTS

EP     0565314     10/1993

OTHER PUBLICATIONS

Adobe Systems Incorporated. "Adobe Acrobat 4.0 and Digital Signatures," Adobe Acrobat 4.0, Nov. 1999.
Adobe Systems Incorporated. "Digitally Sign PDF Documents," Adobe Acrobat 5.0, 2001.

(Continued)

*Primary Examiner* — Beemnet Dada
(74) *Attorney, Agent, or Firm* — Fish & Richardson P.C.

(57) ABSTRACT

Methods and apparatus, including computer program products, implementing and using techniques for establishing trust in an electronic document. An electronic document is received. State dependent content in the electronic document is identified. The state dependent content is content that is renderable to have a several appearances. The electronic document is presented to a user, which includes disclosing the presence of any identified state dependent content in the electronic document.

28 Claims, 2 Drawing Sheets

U.S. PATENT DOCUMENTS

| | | |
|---|---|---|
| 2003/0079175 A1 | 4/2003 | Limantsev |
| 2003/0145206 A1 | 7/2003 | Wolosewicz et al. |
| 2003/0159035 A1 | 8/2003 | Orthlieb et al. |
| 2003/0221105 A1 | 11/2003 | Bajaj |
| 2004/0117726 A1 | 6/2004 | Inada et al. |
| 2004/0181756 A1 | 9/2004 | Berringer et al. |
| 2004/0230891 A1 | 11/2004 | Pravetz et al. |
| 2011/0167504 A1 | 7/2011 | Orthlieb et al. |

OTHER PUBLICATIONS

Microsoft Press "Editing a Macro with the Macro Recorder", Running Microsoft Word 2000, 1999.

Chaudhury et al., "Document Digest Allowing Selective Changes to a Document", U.S. Appl. No. 10/306,779, filed Nov. 27, 2002, to be published by the USPTO.

* cited by examiner

AUTHOR SIGNATURES FOR LEGAL PURPOSES

CROSS-REFERENCE TO RELATED APPLICATIONS

This application is a continuation application of and claims priority to U.S. application Ser. No. 11/966,866, filed on Dec. 28, 2007 (issued as U.S. Pat. No. 7,774,608 on Aug. 10, 2010), which is a continuation application of and claims priority to U.S. application Ser. No. 10/442,679, filed on May 20, 2003 (issued as U.S. Pat. No. 7,315,947 on Jan. 1, 2008).

BACKGROUND OF THE INVENTION

The present invention relates to electronic documents. The use of electronic documents is gaining popularity, and a variety of different formats of electronic documents exist that can be processed by different computer software applications. One example of a common, platform-independent type of electronic document is a PDF (Portable Document Format) document, which has been developed by Adobe Systems Incorporated, San Jose, Calif. PDF documents can be read by PDF readers, such as Adobe® Acrobat® and Adobe® Acrobat® Reader®, or other types of software applications.

While electronic documents are convenient in many ways, they also present a number of issues that may make it difficult to authenticate and/or trust the content of a document. One such issue is that an electronic document may contain state dependent content—that is, content that can be rendered to have a different appearance depending on, for example, when or in what environment the electronic document is viewed.

This makes it possible for malicious users to manipulate the electronic document, such that the document does not always reflect what the author of the electronic document originally created or what a user of the document sees. As a result, a user who takes action in reliance upon such a document may in fact be relying on a document whose content does not actually reflect his or her expectations.

SUMMARY OF THE INVENTION

In general, in one aspect, this invention provides methods and apparatus, including computer program products, implementing and using techniques for establishing trust in an electronic document. An electronic document is received. State dependent content in the electronic document is identified. The state dependent content is content that is renderable to have a several appearances. The electronic document is presented to a user, which includes disclosing the presence of any identified state dependent content in the electronic document.

Advantageous implementations can include one or more of the following features. Receiving an electronic document can include receiving an electronic document that is digitally signed by an author of the electronic document. An attestation from the author in which the presence in the electronic document of any identified state dependent content can be presented. Presenting the electronic document can include validating the author's digital signature. Validating can include verifying the author's digital signature using a certificate verification mechanism through chain validation and/or revocation checking. A level of trust of the electronic document can be determined, and an action can be performed based on the level of trust of the electronic document. Performing an action can include applying a digital user signature to the electronic document. Performing an action can include invalidating a digital author signature of the electronic document.

The state dependent content can perform a function selected from the group consisting of changing an appearance of the document depending on the document's state, and importing external content to change an appearance of the document. It can be determined whether any unauthorized changes have been made to the electronic document since the electronic document was originally signed by the author. Presenting the electronic document can include disclosing the presence of state dependent content when the electronic document is opened on a computer. Presenting the electronic document can include disclosing the presence of state dependent content in response to an input requesting an action in reliance on the electronic document. Presenting the electronic document can include disclosing the presence of state dependent content in response to an input requesting an addition of a digital user signature to the electronic document.

In general, in another aspect, this invention provides methods and apparatus, including computer program products, implementing and using techniques for establishing trust in an electronic document. An electronic document including a digital signature of an author of the electronic document is received. The identity of the author of the electronic document is verified. It is determined whether the electronic document contains any state dependent content that may change appearances without invalidating the digital signature. A disclosure is displayed to a user of any state dependent content found in the electronic document.

The invention can be implemented to realize one or more of the following advantages. The invention provides a framework for enabling a user to establish authenticity and trust in an electronic document, in such a way that the user's experience is similar to establishing authenticity and trust in a conventional, stand-alone paper document. The framework includes a mechanism with which a user can be warned if an electronic document does not disclose what could reasonably be expected by someone who may perform some action based on the supposed authenticity of a document. For example, a user can be warned if the electronic document has any state dependent content that can be rendered to have more than one appearance, so that the appearance of the state dependent content may change before or after the user has viewed and relied on the electronic document, for example by digitally signing the electronic document. A set of tools is provided that allows a user to establish trust of the electronic document by verifying the identify of the author of the document, disclosing the presence of any state dependent content that may perform hidden actions or cause the electronic document to render in a way that depends on the electronic document's state, such as the environment or the time at which the document is presented to the user. The user can also be provided with explanations from the author (i.e., the original creator of the electronic document) as to why the state dependent content is present. Based on the identification of the author, the disclosure of the state dependent content, and the author's explanations of the disclosure, the user can decide whether the content of the document can be trusted before the user signs or otherwise commits to or relies on the content of the document. This explicit documentation makes it possible, in the case of a dispute, to determine from the author's explanations of the disclosures whether the author had malicious intent when preparing the electronic document, and to establish that the user was fully aware of what he or she was signing or relying on. Increasing the reliability of electronic documents from the perspective of both the author and recipient of the document supports the adoption of paperless workflows in a wide variety of settings, including arms-length contractual relationships.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
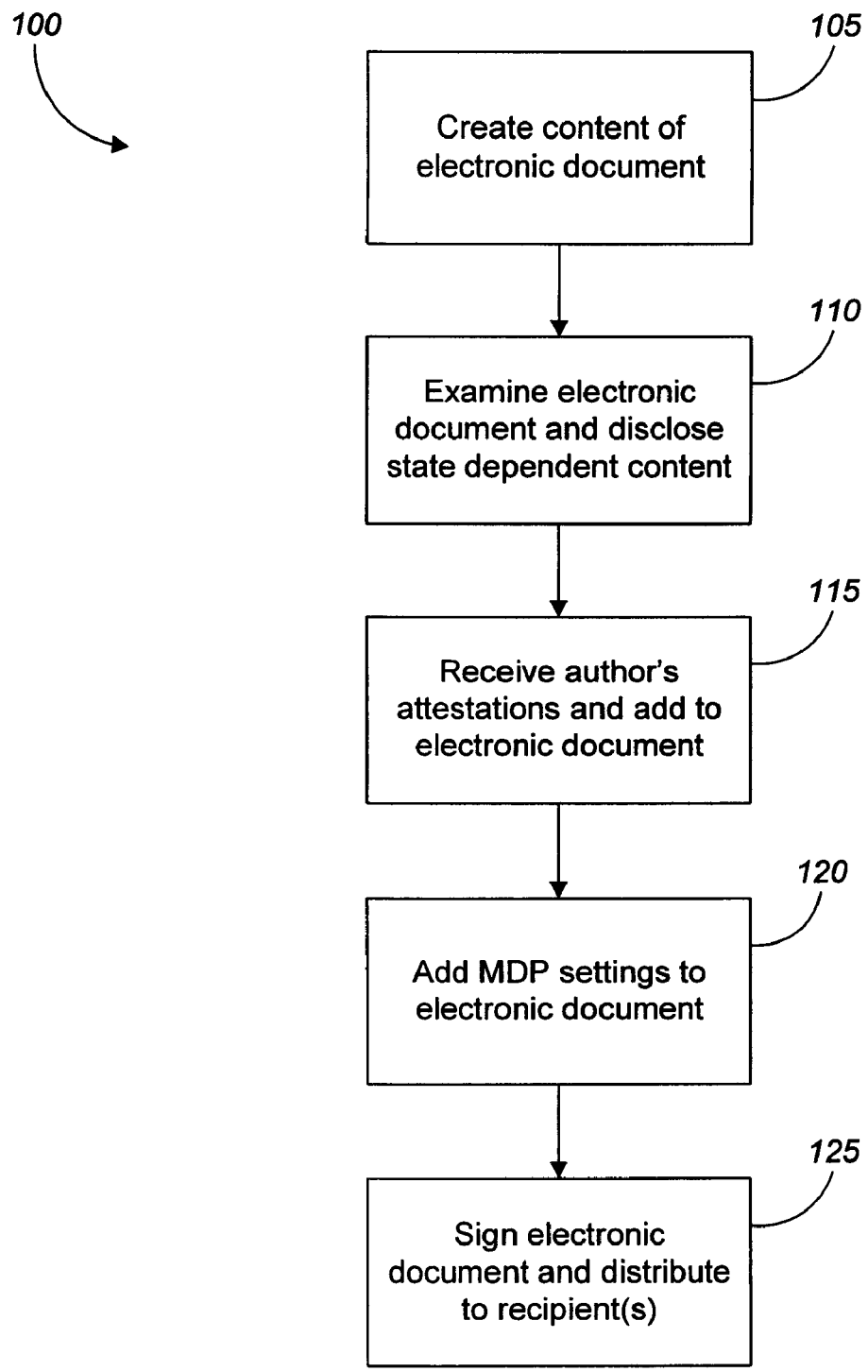
FIG. 1 is a flowchart showing a method for creating an electronic document.

The invention provides a mechanism for increasing the reliability of digitally signed electronic documents. In one aspect, the invention provides a framework for viewing a digitally signed electronic document and subsequently taking action in reliance upon the authenticity and/or trustworthiness of the electronic document and its contents. The framework provides a recipient of an electronic document with a disclosure that identifies state dependent content in the document before the user is required to take action in reliance on the trustworthiness of the document. The disclosure can also include an explanation from an author of the electronic document of why such content might be present in the document. Furthermore, the electronic document may have one or more associated digital signatures by the author and optionally other users from whom the document is received. The author and user signatures can be validated to further establish that the document originates from a trusted source. Using one or more of these framework mechanisms, the trustworthiness of the document and its source can be established before the user of the document takes any action in reliance of the information contained in the electronic document.

For the purposes of this specification, an author of an electronic document is the first person or entity to digitally sign a particular electronic document and provide the signed electronic document to another with the intent that the recipient will rely on the information in the signed electronic document. Typically, the document author may be the person or entity responsible for creating some or all of the content of the electronic document. The author can also set up permissions for the document, such as which users are allowed to sign the electronic document, and/or what modifications can be made to the content of the electronic document by the users.

A user, or recipient, of an electronic document is a person or entity that receives the electronic document. The user can, if permitted by the author, create or make modifications to content of the electronic document as a part of the workflow—for example, by adding comments, counteroffers, or the like. In general, the user is expected to take some action in reliance on the electronic document and/or its content. In some workflows, the author and user are parties to an arms-length transaction, such as a contractual negotiation, and the user is expected to digitally sign the electronic document to signify his or her assent to its terms. Alternatively, the user may be expected to take other action in reliance on the electronic document, such as to incur financial or legal obligations through channels other than the application of a digital signature to the electronic document. There may also be workflows that involve several users, so that, for example, a person who receives an electronic document that is digitally signed by author, signs the document (possibly after adding content to or modifying content in the document) with a user signature before sending the document to another person. It should be noted that the user signatures are subject to the permissions defined by the author.

An electronic document, as used herein, refers to a collection of information that can be read or otherwise processed as a single unit in a computer or some type of electronic document reader. A document contains content, which can include any form of digital content, such as plain or formatted text, graphics, sound, other multimedia data, scripts, executable code, or hyperlinks to other documents. An electronic document does not necessarily correspond to a file. A document may be stored in a portion of a file that holds other documents, in a single file dedicated to the document in question, or in multiple coordinated files.

As can be seen in FIG. 1, a method 100 for creating a reliable, digitally signed electronic document begins with an author creating content of an electronic document using a computer application for creating an electronic document, such as a PDF authoring application (step 105). It should be noted that although the invention is explained by way of example, with reference to PDF documents, the techniques described apply to other types of electronic documents or data types in which rules relating to the content of the document can be included. The content may include state dependent content, which, as used in this specification, refers to content that can be rendered to have a different appearance depending on one or more of a variety factors or conditions. The factors or conditions can include conditions relating to the environment in which the document is opened—for example, the application used to open the document, the operating system running on the computer used to open the document, the identity of the user, or the date or time at which the document is opened. The factors or conditions can also include actions that occur while the document is open for viewing, such as navigation from one section or page of the document to another section or page. Because the appearance of state dependent content can change depending on external factors, it can be used to misrepresent the content of the document, thereby undermining the reliability of the document (and any signatures applied to the document) and the expectations of users who may view, and potentially rely upon, content in the document. Thus, for example, a document can include state dependent content that remains hidden under some conditions—such as when the document is being viewed on a computer monitor—but that is visible under other conditions, such as when the document is printed. Similarly, content of a first page of a document can have a first appearance to a user viewing that page (e.g., a form field may appear to contain the number "100"), but a different appearance (e.g., the form field's content may change to "100,000") when the user navigates to a subsequent page of the document. In either example, if the user digitally signs the document after viewing the content, he or she may assume that the document's content is as it appeared during the viewing; in fact, however, the content may be significantly different if the document is printed on a printer, or if the user signed the document after navigating to another page.

The content of the document is examined to identify state dependent content in the electronic document and disclose any identified state dependent content to the document author (step 110). The examination may, for example, be initiated in response to an indication by the author that he or she wishes to apply a digital author signature to the electronic document, to send the document to one or more users, or to save the document. In one implementation, the document is examined to identify state dependent content types such as Embedded Scripts, External content, Multimedia content, Annotations, AlternateImages actions, Embedded TrueTypeFonts actions, External OPI dictionaries, NonEmbeddedFonts, Device dependent graphics parameters, Flatness tolerance, Optional Content. Each of these types of state dependent content will now be briefly explained below.

Embedded Scripts—Scripts can be embedded in the document that are executed by the application that is viewing the document in response to actions that occur on the document. Types of actions are virtually unlimited—examples include filling in form fields, flipping pages, and opening the document. Depending on the nature of the script, this can cause, for example, interactive form fields in the document to update their values or change their visual appearances. As one example of misrepresentation caused by such a script, a malicious user might place a script in a file that is attached to a flip page event, such that when a user switches from page one to page two, values that the user entered in form fields on page one will change. When the user switches back to page one again, the values can be changed back so that the user will never know that the values have changed. If the user digitally signs the document on page two, he or she may be unaware that the signed document includes form field entries different than those he or she saw on page 1.

External content—This includes any external content that is not covered by the signature that may be viewed within the electronic document or modify content in the electronic document. This content can include, for example, references to images and streams that are not part of the electronic document, and which can be changed without invalidating the author's signature. Another example is a link to an external data and/or script file that may, as a result of some action, be caused to be loaded into the document or executed against the document.

Multimedia content—This includes content in the electronic document that is, by its nature, dynamic—for example movies, animations or sound. Further, if the display of this content can be changed as a result of some actions, then they can allow for a more obvious malicious use.

Annotations—Annotations or comments, if allowed to be added to, modified in, or removed from an electronic document, can be used to misrepresent the content of the electronic document. An example is an annotation that is a rectangular block of text with a white background, or a rectangular white box with no text, which can be overlayed over existing content in the document. Further, if these annotations can be made to be hidden and unhidden as a result of some actions performed on the document, they can allow for a more obvious malicious use.

AlternateImages actions—Alternate images can be used to include multiple versions of an image in an electronic document, such as a PDF document, for different purposes. Often these variant representations of the image may differ, for example, in resolution or in color space. The primary goal is to reduce the need to maintain separate versions of the electronic document for low-resolution on-screen viewing and high-resolution printing. A malicious user might instead use this feature to present a different image than the image that a user signing the document expects to be presented.

Embedded TrueTypeFonts actions—The TrueType font format was developed by Apple Computer, Inc., and has been adopted as a standard font format for the Microsoft Windows operating system. Embedded TrueType fonts can render differently based depending on the environment in which the document is viewed or printed. A malicious user might use this feature to change the content of a document so that it is different when it is printed compared to when it is viewed on a screen, or so that it changes after a certain date, or changes dependent on the magnification (zoom) of the document, and so on.

External OPI dictionaries—When parts of a PDF document are moved from one application to another in a prepress workflow, it is useful to separate the data of high-resolution images, from the document itself. The Open Prepress Interface (OPI) is a mechanism, originally developed by Aldus Corporation, for creating low-resolution placeholders, or proxies, for such high-resolution images. The proxy typically consists of a down sampled version of the full-resolution image, to be used for screen display and proofing. Before the document is printed, it passes through a filter known as an OPI server, which replaces the proxies with the original full-resolution images. Again, this mechanism might be used by a malicious user to import an image different than the one the user signing the document expects to be imported.

NonEmbeddedFonts—Fonts that are not embedded in a PDF file as data contained in a PDF stream object. This may result in a trust issue if a person is signing a document on a system that is configured to contain trusted content, in which case an embedded font would be an example of content that should be trusted.

Device dependent graphics parameters—Device dependent graphics parameters are graphics parameters that are handled differently by different devices. Examples of device dependent graphics parameters include Overprint Control, Halftone, Under Color Removal, Transfer Function and Black Generation. Some devices may ignore these parameters completely. Hence these parameters can be manipulated to render the document differently on different devices, for example, the document may have one appearance when it is viewed on a screen and another appearance when it is printed. For instance, the Under Color Removal, Transfer Function and Black generation parameters are used to map from input colors to device colors on printer devices. These parameters can thus be manipulated by a malicious user, for example, to make the red color go away or appear as black color when printing a document. This could result in that some warnings to a user vanish entirely, or appear as non-warnings.

Flatness tolerance—The flatness tolerance specifies the precision with which curves are rendered on an output device. Specifying a Flatness Tolerance in a PDF document makes the document device dependent. Specifically, the rendered appearance depends on the resolution of the output device. This can be manipulated to make diagrams appear different between relatively low resolution devices (such as computer screens) and high resolution devices (such as printers).

Optional Content—Optional Content can be used to hide or display content based on external conditions or environmental conditions. The appearance of the document can change from one view to another. This is directly contradicting the idea of "what you see is what you sign," because what is seen is state dependent in the presence of optional content.

The author views the generated disclosure and can, if she desires, provide an attestation (step 115) that will be presented to a user receiving the electronic document in order to explain why the disclosure, and the corresponding state dependent content, are present in the electronic document.

Optionally, the method can then receive MDP (Modification Detection and Prevention) settings for the document from the author (step 120). The MDP settings are a signature add-on that allows the author to specify what content are allowed to change in a document before the author's digital signature of the document will become invalid. Some examples of such settings include: allow form field fill-in, allow annotations, allow no changes, allow all changes, and so on at an arbitrary granularity level for the electronic document. The MDP mechanism has been described in the copending patent application entitled "Document Modification Detection and Prevention," to James D. Pravetz, Krish Chaudhury, and Sunil C. Agrawal, which was filed on May 16, 2003, was assigned U.S. Ser. No. 10/440,487 and was issued as U.S. Pat. No. 7,735,144 on Jun. 8, 2010, and which is hereby incorporated herein by reference in its entirety. Related techniques have been described in the following three copending patent applications, which are also incorporated by reference in their entireties: U.S. Ser. No. 10/080,923, filed on Feb. 21, 2002, and issued as U.S. Pat. No. 7,213,269 on May 1, 2007; U.S. Ser. No. 10/306,635, filed on Nov. 27, 2002, and issued as U.S. Pat. No. 7,278,168 on Oct. 2, 2007; and U.S. Ser. No. 10/306,779, also filed on Nov. 27, 2002. If the author chooses not to include any MDP settings, then there will be no way to detect that what is presented actually reflects the original document that was signed by the author, and consequently a recipient may find it more difficult, or even impossible, to trust the content of the document. Finally, the author signs the electronic document, any MDP settings, and the attestations, and distributes the document to one or more users (step 125). Optionally, the author's signature may also encompass the disclosures displayed in step 110, which can be stored as part of the electronic document. The electronic document can be distributed by any type of conventional means, such as through a network as e-mail or be downloaded to a user's computer. Alternatively, the electronic document can be stored on some type of carrier for digital data, such as a floppy disk or a CD that is sent or given to a user.

Figure 2:
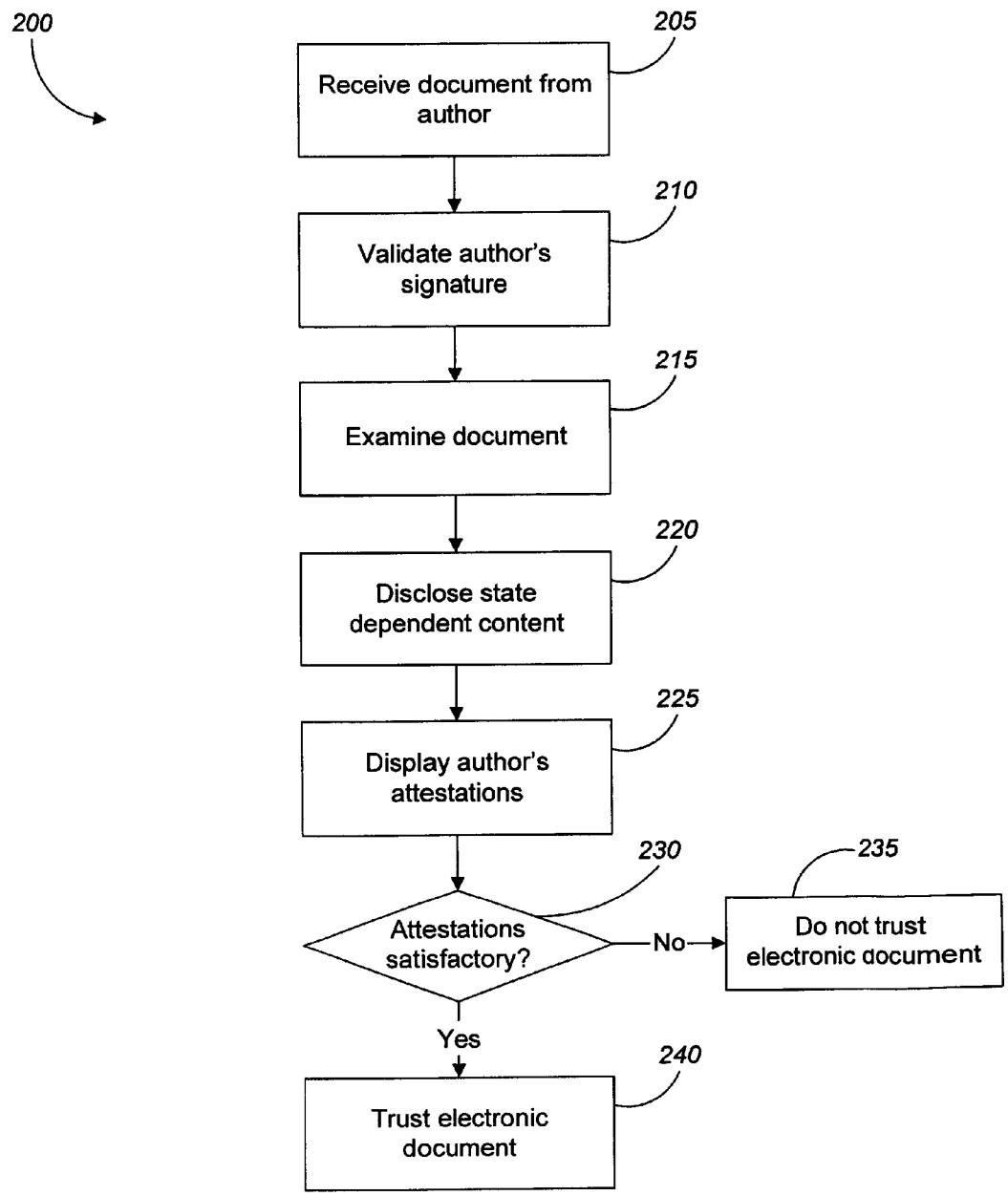
FIG. 2 is a flowchart showing a method for reviewing and trusting an electronic document.

FIG. 2 shows a method for reviewing and establishing trust in a document. The method 200 starts by receiving a document from an author or other source by any of the abovementioned means (step 205). The author's signature is then validated (step 210). The validation can include displaying the author's (or other signer's) identity. In one implementation, the author's signature is validated by verifying the identity of the author, verifying that the bytes of the document that were originally signed by the author have not been modified, and/or verifying that any changes that have been made since it was signed are authorized (e.g., by the author's MDP settings as described above). The identity of the author can be verified by verifying that the author's certificate is directly, or through a trust chain that chains up to a trusted root certificate, trusted by the recipient, and that the certificate has not been revoked. In its simplest form, certificate trust can be established by comparing the certificate against a local list of trusted certificates or root certificates. In alternate situations, trust is established by contacting a trusted on-line validation service to verify the signature. If the document author has authorized changes to be made to a document as described above and in application Ser. No. 10/306,779, incorporated by reference above, these changes are analyzed using the MDP mechanism described elsewhere to determine whether the changes are permitted by the author.

The document is then examined to identify any state dependent content (step 215). As described above in the context of step 110 in FIG. 1, the examination can include identifying state dependent content in the electronic document, such as Embedded Scripts, External content, Multimedia content, Annotations, AlternateImages actions, Embedded TrueType-Fonts actions, External OPI dictionaries, NonEmbedded-Fonts, Device dependent graphics parameters, Flatness tolerance, Optional Content, which were described above. As a result, a disclosure indicating that the document contains state dependent content is presented to the user (step 220). The examination of the document content can be performed and subsequent disclosure regarding state dependent content can be presented at a variety of times in a workflow, depending on the particular implementation. For example, the examination can be performed and the disclosures presented immediately upon receipt of the document, immediately prior to signing the document, or at the user's request, for example, by activating a button or performing a similar action. The disclosures can include a text message identifying state dependent content in the document—for example, a message such as "This document contains JavaScripts. These are actions that may change the document you are signing. You should not sign the document unless you trust the author," or the like.

After the disclosures have been presented, the corresponding attestations, if any, are displayed (step 225). In some implementations, the disclosures and associated attestations are presented simultaneously to the user. In other implementations, the user may be given a choice whether to view the attestations after the disclosures have been displayed. Optionally, the user can be provided the opportunity to obtain additional information about the disclosures or the attestations. For example, the method can provide "standard" explanations for the various disclosures and attestations that may be displayed to the user—that is, generic explanations of what different types of content are and how they can affect the document. These standard disclosures may be displayed in addition to, or in the absence of, any particular explanations made by the author. The method can also be configured to provide specific disclosures identifying particular state dependent content identified in the examining step, and/or specific explanations that relate to the particular state dependent content identified in the electronic document. At some point during the method, additional disclosures can be presented to caution the user against taking any action in reliance on the electronic document unless the user is fully satisfied that the document is trustworthy.

In an alternative implementation, the disclosures and attestations generated in steps 220 and 225 above are embedded in the electronic document in a safe way, so that the user application does not need to examine the electronic document for state dependent content or generate disclosures relating to such content. Instead, the disclosures and attestations can simply be read from the document and presented to the user. The disclosures and attestations are included as part of the data that is signed by the author, so that a record is provided of the author's attestations.

The user then decides whether there is a reason to be concerned about the disclosures and whether the author's attestations are satisfactory (step 230). If the user does not trust the content of the document and/or the explanations provided by the author, the document is dismissed as being not trusted (step 235). If, on the other hand, the user accepts the presence of any identified state dependent content in spite of the disclosures, the electronic document is trusted (step 240). When the user trusts the electronic document, this typically results in some additional user action, such as signing the document or otherwise incurring financial or legal obligation based on the document. If the document is not trusted, typically no action is taken based on the content of the document.

An exemplary workflow in which the invention can be used will now be described. Assume that a government agency, such as the IRS, is the author of an electronic document, such as a tax form, and wants to apply an author signature to the document. The tax form in this example has state dependent content in the form of JavaScripts that are used for calculation of values for certain form fields.

Before the author signature can be applied, the document authoring application examines the electronic document and indicates to the author that the document contains state dependent content (in this case, the JavaScripts). This can include a generic disclosure that state dependent content has been found in the document; alternatively, the specific state dependent content found in the examination can be identified to the author. The author can then add an attestation to the electronic document, in which the author explains why the JavaScripts are present in the document—that is, to calculate values for the form fields. After the attestation has been added, the author signs the document, which is now ready for distribution to one or more users.

A user, such as a taxpayer, downloads the electronic tax form from the IRS's website. When the document is opened on the user's computer, the application informs the user that the document has been signed by the IRS. If the user trusts the IRS as a reliable author, he or she proceeds to fill out the tax form. When the user indicates that he or she is ready to add a digital user signature to the tax form, the application on which the tax form is opened examines the document and presents a disclosure informing the user that the document includes state dependent content in the form of one or more JavaScripts. The application also presents the author's attestation regarding that content. After considering the disclosure and attestations, the user can choose whether to accept the document and proceed with the digital signature. Alternatively, if the user is not willing to accept the state dependent content, or if the user is not comfortable with the author's explanations, the document can be rejected. In the event that the user decides to sign and submit the form despite the disclosures and a dispute later arises over the user's tax form, the disclosures and attestations, and the user's subsequent decision to sign the document, can be used to demonstrate the parties' expectations and intent. For example, the disclosures and attestations can be used to show that the user was fully aware of the contents of the document. Likewise, the author's explanations of the state dependent can be compared with the actual content itself to show whether the author forthcoming with its explanation of the content, and to establish that the author did, or did not, intend to deceive the user.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. Other embodiments are within the scope of the following claims. For example, the steps of the invention can be performed in a different order and still achieve desirable results.

What is claimed is:

1. A computer-implemented method, comprising:
   identifying state dependent content in an electronic document, wherein the state dependent content is associated with a plurality of appearances;
   replacing at least a portion of the state dependent content with state independent content having a single appearance;
   digitally signing the electronic document to generate a signed electronic document including a digital signature corresponding to a person associated with an attestation; and
   creating a second electronic document, wherein the second electronic document includes the state dependent content, wherein the replacing at least the portion of the state dependent content with state independent content having a single appearance comprises replacing at least the portion of the state dependent content in the second electronic document with state independent content having a single appearance.

2. The computer-implemented method of claim 1, wherein the plurality of appearances is based on one or more of an environment in which the electronic document is opened and an action that occurs while the electronic document is open.

3. The computer-implemented method of claim 1, wherein the single appearance of the state independent content is associated with the content included in the electronic document.

4. The computer-implemented method of claim 1, wherein the single appearance is based on one or more of an environment in which the electronic document is opened and an action that occurs while the electronic document is opened.

5. The computer-implemented method of claim 1, wherein the single appearance is equal to one of the plurality of appearances associated with the portion of the state dependent content.

6. The computer-implemented method of claim 1, wherein identifying state dependent content further comprises:
presenting a disclosure of the state dependent content.

7. A computer-implemented method, comprising:
identifying state dependent content in an electronic document, wherein the state dependent content is associated with a plurality of appearances;
replacing at least a portion of the state dependent content with state independent content having a single appearance;
digitally signing the electronic document to generate a signed electronic document including a digital signature corresponding to a person associated with an attestation;
receiving the attestation corresponding to the state dependent content; and
associating the attestation with the electronic document before digitally signing the electronic document.

8. The computer-implemented method of claim 1, wherein the state dependent content in the electronic document comprises TrueTypeFont content.

9. The computer-implemented method of claim 7, wherein the plurality of appearances is based on one or more of an environment in which the electronic document is opened and an action that occurs while the electronic document is open.

10. The computer-implemented method of claim 7, wherein the single appearance of the state independent content is associated with the content included in the electronic document.

11. The computer-implemented method of claim 7, wherein the single appearance is based on one or more of an environment in which the electronic document is opened and an action that occurs while the electronic document is opened.

12. The computer-implemented method of claim 7, wherein the single appearance is equal to one of the plurality of appearances associated with the portion of the state dependent content.

13. The computer-implemented method of claim 7, wherein identifying state dependent content further comprises:
presenting a disclosure of the state dependent content.

14. The computer-implemented method of claim 7, wherein the state dependent content in the electronic document comprises TrueTypeFont content.

15. A system comprising:
a computer-readable medium encoding an electronic document;
a display device; and
processor electronics configured to perform operations comprising:
identifying state dependent content in the electronic document, wherein the state dependent content is associated with a plurality of appearances;
replacing at least a portion of the state dependent content with state independent content having a single appearance;
digitally signing the electronic document to generate a signed electronic document including a digital signature corresponding to a person associated with an attestation;
receiving the attestation corresponding to the state dependent content; and
associating the attestation with the electronic document before digitally signing the electronic document.

16. The system of claim 15, wherein the plurality of appearances is based on one or more of an environment in which the electronic document is opened and an action that occurs while the electronic document is open.

17. The system of claim 15, wherein the single appearance of the state independent content is associated with the content included in the electronic document.

18. The system of claim 15, wherein the single appearance is based on one or more of an environment in which the electronic document is opened and an action that occurs while the electronic document is opened.

19. The system of claim 15, wherein the single appearance is equal to one of the plurality of appearances associated with the portion of the state dependent content.

20. The system of claim 15, wherein identifying state dependent content further comprises:
presenting a disclosure of the state dependent content.

21. The system of claim 15, wherein the state dependent content in the electronic document comprises TrueTypeFont content.

22. A system comprising:
a computer-readable medium encoding an electronic document;
a display device; and
processor electronics configured to perform operations comprising:
identifying state dependent content in the electronic document, wherein the state dependent content is associated with a plurality of appearances;
replacing at least a portion of the state dependent content with state independent content having a single appearance;
digitally signing the electronic document to generate a signed electronic document including a digital signature corresponding to a person associated with an attestation; and
creating a second electronic document, wherein the second electronic document includes the state dependent content, wherein the replacing at least the portion of the state dependent content with state independent content having a single appearance comprises replacing at least the portion of the state dependent content in the second electronic document with state independent content having a single appearance.

23. The system of claim 22, wherein the plurality of appearances is based on one or more of an environment in which the electronic document is opened and an action that occurs while the electronic document is open.

24. The system of claim 22, wherein the single appearance of the state independent content is associated with the content included in the electronic document.

25. The system of claim 22, wherein the single appearance is based on one or more of an environment in which the electronic document is opened and an action that occurs while the electronic document is opened.

26. The system of claim 22, wherein the single appearance is equal to one of the plurality of appearances associated with the portion of the state dependent content.

27. The system of claim 22, wherein identifying state dependent content further comprises:
presenting a disclosure of the state dependent content.

28. The system of claim 22, wherein the state dependent content in the electronic document comprises TrueTypeFont content.

* * * * *